United States Patent [19]

Wicke

[11] 3,896,835

[45] July 29, 1975

[54] HEAT RESPONSIVE SAFETY DEVICE FOR GATE VALVES

[75] Inventor: Charles H. Wicke, Richmond, Tex.

[73] Assignee: ACF Industries, Incorporated, New York, N.Y.

[22] Filed: Dec. 29, 1972

[21] Appl. No.: 319,123

[52] U.S. Cl. .................... 137/75; 137/72
[51] Int. Cl.² .................... F16K 17/38
[58] Field of Search ............ 220/89 B; 137/72, 77

[56] References Cited
UNITED STATES PATENTS

| 166,452 | 8/1875 | Brown et al. ............ 137/72 X |
| 1,206,341 | 11/1916 | Leavitt .................... 137/72 X |
| 1,243,998 | 10/1917 | Smyly ...................... 137/75 |
| 1,771,716 | 7/1930 | Lovekin .................... 137/77 |
| 2,035,497 | 3/1936 | Morse ...................... 220/89 B X |
| 3,659,624 | 5/1972 | Kelly et al. ............... 137/75 |
| 3,842,853 | 10/1974 | Kelly et al. ............... 137/75 |

Primary Examiner—Martin P. Schwadron
Assistant Examiner—Richard Gerard
Attorney, Agent, or Firm—Eugene N. Riddle

[57] ABSTRACT

A heat responsive safety device for a gate valve includes a releasable locking means for the valve stem. The releasable locking means comprises an inner cap held within an outer cap by a plurality of spherical ball members. A movable plug holds the ball members in locking engagement with the inner and outer caps in a first locked position and permits release of the inner cap from the outer cap in a second unlocked position of the inner and outer caps. A fusible material holds the plug in its locked position and upon melting the fusible material is metered through a predetermined opening and upon a decrease in volume of the fusible material the plug moves to permit unlocking of the inner cap from the outer cap. Thereupon the valve stem is released for movement of the gate valve to a closed position.

2 Claims, 6 Drawing Figures

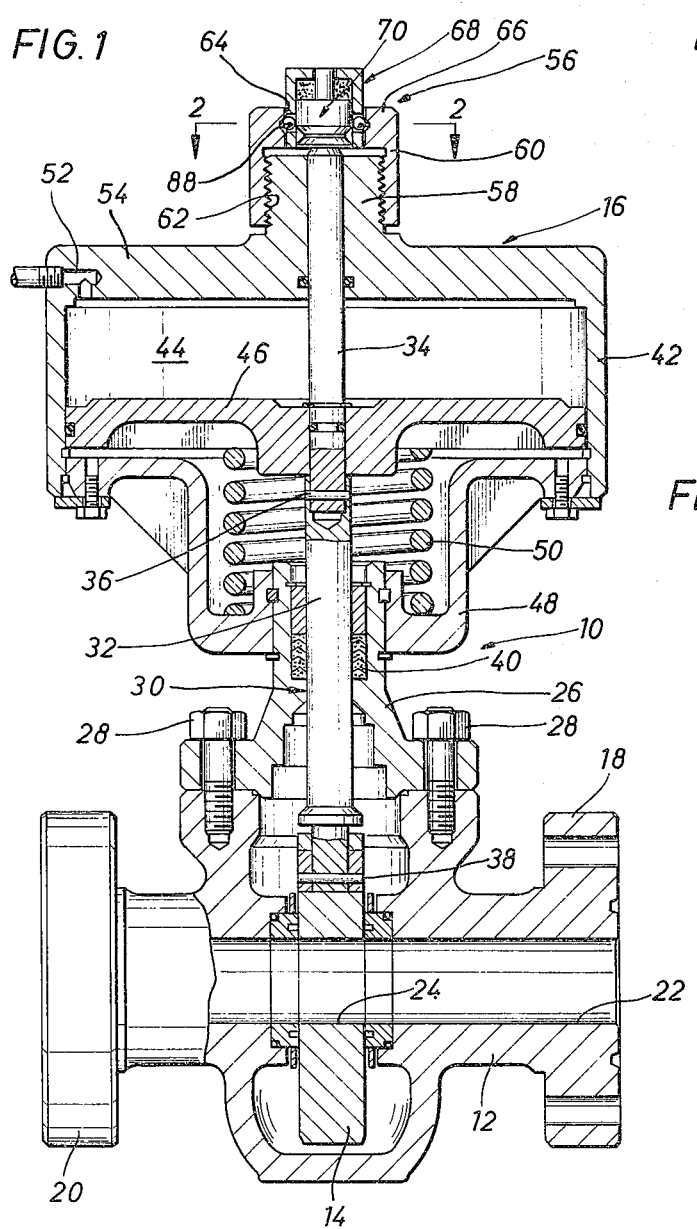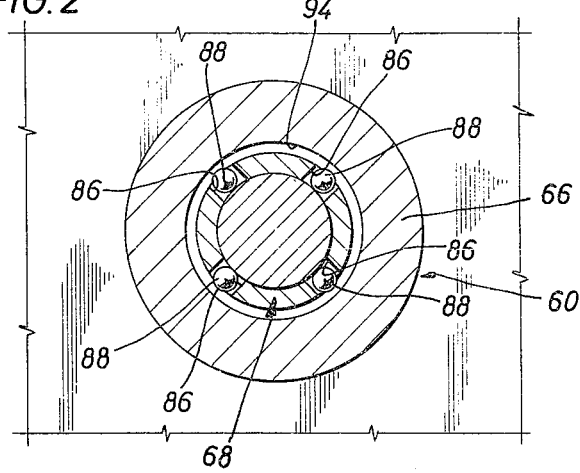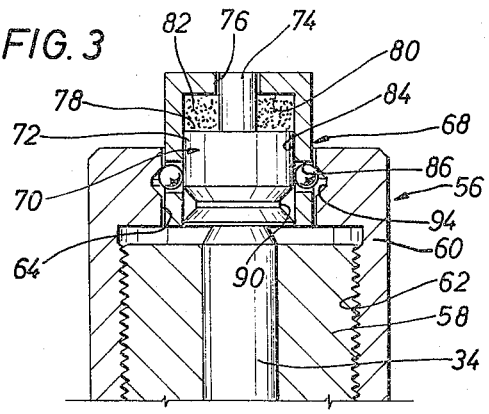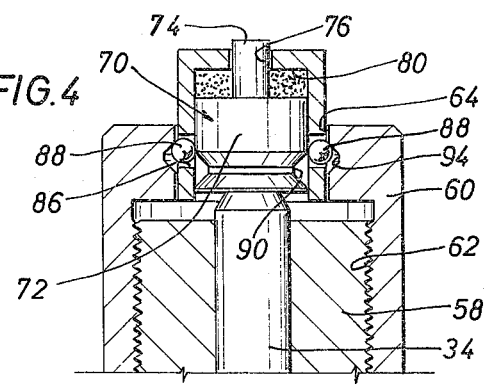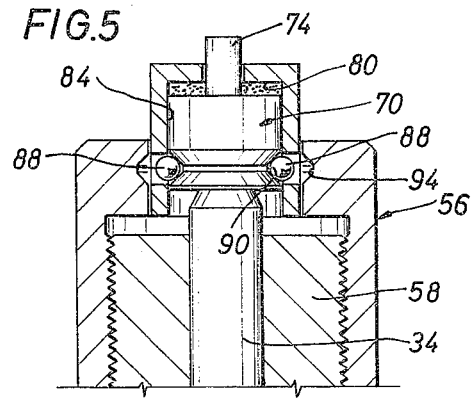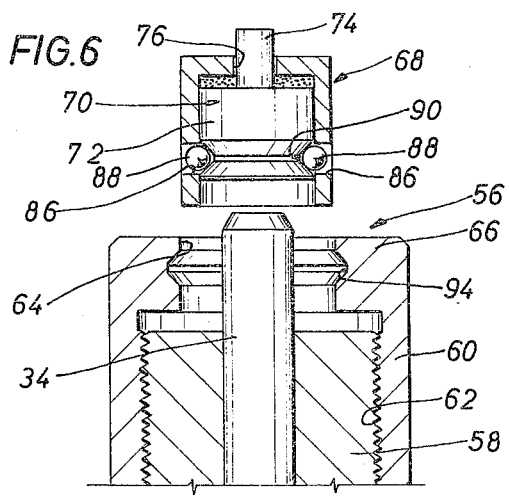

3,896,835

HEAT RESPONSIVE SAFETY DEVICE FOR GATE VALVES

BACKGROUND OF THE INVENTION

Copending application Ser. No. 313,288 was filed Dec. 8, 1972, now U.S. Pat. No. 3,838,705 and discloses a releasable locking means for a gate valve in which a fusible material is provided. The outward bias of the valve stem places the fusible material under a compressive force and upon reaching a predetermined high temperature, the fusible material melts and is metered through a predetermined opening resulting in the release of the valve stem for movement of the gate valve to a closed position. The release mechanism in said copending application Ser. No. 313,288 comprises plungers having tapered ends which engage the upper end of the valve stem. The plungers move outwardly upon melting of the fusible material and metering of the fusible material through ports. Thrust loads from the valve stem as high as 15,000 to 20,000 lbs. are exerted on the tapered ends of such plungers. It has been found that such tapered ends sometimes score the valve stem as it moves upwardly.

Brief Description of the Present Invention

The present invention is directed to a heat responsive releasable locking means for a gate valve stem which is highly sensitive to a predetermined high temperature. The fusible material is under compression resulting from the urging of the valve stem against a plug directly adjacent the fusible material. An inner cap is provided within an outer cap and is releasably locked to the outer cap by a plurality of ball bearing members which engage a groove in the outer cap. Upon the melting of the fusible material, the plug moves upwardly upon a metering of the fusible material from a predetermined opening adjacent the fusible material. The movement of the plug results in the positioning of the ball members adjacent the groove in the plug and the ball members move inwardly to release the inner cap from the outer cap. The thrust from the valve stem may, for example, be between 10,000 to 20,000 lbs. and this thrust is transmitted by the valve stem through the ball bearings which releasably connect the inner cap to the outer cap. The ball bearing members easily transmit the forces between the inner cap and the outer cap and have been found to be a highly effective manner of permitting the gate valve to move to a closed position upon a predetermined ambient temperature being reached. The plug member is mounted for moving a predetermined distance upon urging from the valve stem before the ball members release the inner cap. The release of the inner cap may be varied for various temperatures and times dependent upon such variables, for example, as the upward movement of the plug, the type of fusible material employed, the size of the opening adjacent the fusible material through which the fusible material is metered, and the thickness of the fusible material. The provision of an inner cap which is released from an outer cap through the release of ball valve members has been found to be highly effective.

The invention accordingly comprises a construction hereinafter described, the scope of the invention being indicated in the following claims.

In the accompanying drawings, in which one of various possible embodiments of the invention is illustrated, FIG. 1 is a sectional view of a gate valve structure illustrating the gate and fluid actuator therefor with the heat responsive releasable means for the gate valve stem mounted on the fluid cylinder;

FIG. 2 is a sectional view taken generally along line 2—2 of FIG. 1;

FIG. 3 is an enlarged fragment of FIG. 1 showing the inner cap mounted within the outer cap in the open position of the gate;

FIG. 4 is a sectional view similar to FIG. 3 but showing the fusible material partially melted and being metered through the predetermined opening to permit an upward movement of the plug member;

FIG. 5 is a sectional view similar to FIGS. 3 and 4 but showing the plug member after an upper movement thereof with the groove in the plug member receiving the ball bearing members which lock the inner cap to the outer cap; and FIG. 6 is a sectional view showing the inner cap pushed outwardly by the valve stem and being removed from the outer cap and cylinder.

Referring to the drawings, the valve structure generally indicated 10 includes a valve body 12, a gate 14, and an actuator generally indicated 16 which moves gate 14 between open and closed positions. Body 12 has flanges 18 and 20 which are adapted to be connected to a flowline (not shown), and a bore 22 extends through body 12 in alignment with a port 24 in gate 14 when gate 14 is in open position.

A bonnet 26 is connected by suitable nut and bolt combinations 28 to valve body 12. A valve stem generally indicated 30 has a lower stem portion 32 and an upper stem portion 34 connected thereto by retainer pin 36. Lower stem portion 32 is connected to gate 14 by retainer pin 38. A stem packing 40 in bonnet 26 extends about lower stem portion 32. Actuator 16 includes a cylinder 42 having a fluid chamber 44 and a piston 46 secured to upper stem portion 34 for movement therewith. Base 48 houses a spring 50 therein which engages the inner surface of piston 46 to urge continuously piston 46 outwardly to the closed position of gate 14. A suitable source of fluid may be provided through bore 52 in the upper portion of outer end wall 54 of cylinder 42. All of the above construction comprises conventional gate valve structure. It is to be understood actuator 16 may be operated either by gas or liquid.

The present invention is directed particularly to a cap assembly generally indicated 56 mounted on a threaded extension 58 of cylinder end wall 54. Cap assembly 56 includes an outer cap 60 having internal screw threads 62 in engagement with external threads on extension 58. A central opening 64 in upper end 66 of outer cap 60 receives an inner cap generally indicated 68 therein. Inner cap 68 has a movable plunger or plug generally indicated 70 mounted therein which includes a body portion 72 and a generally cylindrical extension or end 74 which is received within an opening 76 in the upper end of inner cap 68. A shoulder or ledge 78 is provided adjacent cylindrical portion 74. Mounted between shoulder 78 and upper inner end surface 80 of inner cap 68 is an annulus 82 of a eutectic material which fits about extension 74 and is seated on shoulder 78.

A predetermined clearance between extension 74 and the surface defining opening 76 in inner cap 68 is provided and may preferably be around .015 inch. The clearance of .015 inch permits a metering of the fusible material upon fusing or melting thereof at a predetermined high temperature. If desired, a clearance of .015 inch may be provided between the outer surface of plug 72 and the inner surface of inner cap 68 to permit a metering of the eutectic material between the outer surface of plug 70 and inner surface 84 of inner cap 68. Inner cap 68 has a plurality of openings 86 therein particularly as shown in FIG. 2 and mounted within each opening 86 is a spherical ball bearing member 88. Ball members 88 are of a diameter greater than the wall thickness of inner cap 68. For example, wall thickness of cap 68 may be around one-fourth inch with a diameter of three-eighths inch for ball bearing members 88. Plug 70 has an annular groove 90 defined by outwardly tapered upper and lower surfaces. The upper and lower surfaces are at a 45° angle with respect to the longitudinal axis of plug 70.

A complementary annular groove 94 is provided in outer cap 56 and has outwardly tapered upper and lower surfaces therof arranged at a 45° angle with respect to the longitudinal axis of valve stem portion 34. As shown in the drawings with fusible material 82 positioned between plug body 72 and cap 68, a portion of ball members 88 projects within groove 94 as shown in FIGS. 1, 3, and 4 to hold inner cap 68 in locked position within outer cap 56. Valve stem portion 34, which may have a thrust load thereon as high as 20,000 lbs., for example, urges plug 70 against fusible material 82, and fusible material 82 transmits the load to inner cap 68. Inner cap 68 transmits the load to ball members 88 and outer cap 60.

In order for ball members 88 to be received in groove 90 which permits release of inner cap 68, plug 70 must move upwardly a distance of around three-eighths inch, for example. Thus, the thickness of fusible material 82 must be at least equal to three-eighths inch and preferably is around one-half inch.

As a specific but non-limiting example of the fusible material 82, a material sold under the name "Cerrocast" by Cerro Copper and Brass Company, Bellefonte, Pa. has been found to be satisfactory. "Cerrocast" comprises 60 percent tin and 40 percent bismuth and has a yield temperature of 302° F. The material will commence to break down or creep at 281° F. and will melt or be metered from the clearance between plug extension 74 and opening 76. It is to be understood that the time required for the melting of fusible material 82 will depend on various factors, such as the type of fusible material employed, the intensity of the temperature, the size of openings through which the fusible material is metered, the thickness of the fusible material, and the amount of movement required for the plug before release of the inner cap from the outer cap. Such factors may be varied to provide the desired temperature at which failure will occur in material 82 and the reaction time required for such failure.

What is claimed is:

1. A heat responsive release assembly for an outwardly biased valve stem, the assembly being mounted on a threaded extension of a cylinder for a valve actuator and comprising, an internally threaded sleeve threaded on said extension, an inverted cap detachably mounted within said sleeve, a plug movably mounted within said cap and engaging said stem, a fusible material positioned within the inverted cap between the plug and the adjacent end surface of the inverted cap, said plug being urged by the thrust of the valve stem against the fusible material, said assembly having at least one metering opening for the fusible material provided adjacent the fusible material and upon a predetermined temperature being reached the fusible material melting and flowing through said metering opening to reduce the volume of fusible material adjacent said plug to permit outward movement of the plug under the bias of the valve stem, a plurality of spherical ball elements for releasably locking the inverted cap to the sleeve, a plurality of radially spaced openings in the wall of said inner cap receiving the ball elements therein with said ball elements being of a diameter greater than the wall thickness of said inner cap, said sleeve having an inner annular groove therein adjacent said radially spaced openings and receiving a projecting portion of the ball elements for releasably holding the inner cap within said sleeve, said plug having an annular groove therein spaced inwardly of said ball elements when said inner cap is releasably locked in position by said spherical ball elements, said plug groove upon outward movement of said plug being disposed adjacent and receiving said spherical ball elements to permit disengagement of said ball elements from the groove of said sleeve and release of said cap from said sleeve, said cap having a central end opening therein and said plug having a reduced diameter cylindrical extension thereon fitting within said end opening, and said fusible material being ring shaped and fitting about said cylindrical extension between said plug and the end surface of said cap.

2. A heat responsive valve stem release as set forth in claim 1 wherein said metering opening forms a clearance between said cylindrical extension and the adjacent surface defining the end opening, said clearance being between around 0.005 inch and 0.050 inch.

* * * * *